United States Patent [19]

Westermann

[11] 4,263,354
[45] Apr. 21, 1981

[54] DEMETALIZING A METALIZED, PLASTIC FOIL ALONG A STRIP OR EDGE PORTION

[76] Inventor: Wilhelm Westermann, Schellingstrasse 7, 6800 Mannheim 1, Fed. Rep. of Germany

[21] Appl. No.: 960,067

[22] Filed: Nov. 13, 1978

[51] Int. Cl.³ .................... B05D 3/12; B05C 11/02
[52] U.S. Cl. .................... 427/444; 15/93 R; 15/256.5; 29/121.8; 118/102
[58] Field of Search .......... 427/360, 278, 444, 172, 427/176; 51/74 R, 75; 76/101 A; 29/DIG. 19, 121.8, 81 J, 81 R; 118/102; 15/93 R, 256.5

[56] References Cited

U.S. PATENT DOCUMENTS

| 1,743,623 | 1/1930 | Ross | 29/121.8 X |
| 2,114,072 | 4/1938 | Cleveland | 29/121.8 |
| 2,498,982 | 2/1950 | Davies | 76/101 A |
| 3,943,666 | 3/1976 | Dion et al. | 51/75 X |

FOREIGN PATENT DOCUMENTS 2509543  9/1976  Fed. Rep. of Germany.
2713682 10/1978  Fed. Rep. of Germany.

Primary Examiner—Evan K. Lawrence
Attorney, Agent, or Firm—Smyth, Pavitt, Siegemund & Martella

[57] ABSTRACT

A metalized plastic foil is demetalized along an edge by means of a rotating, narrow steel disk whose periphery has been roughened by means of sandblasting or electroerosion.

7 Claims, 2 Drawing Figures

DEMETALIZING A METALIZED, PLASTIC FOIL ALONG A STRIP OR EDGE PORTION

BACKGROUND OF THE INVENTION

The present invention relates to demetalization of portions of metalized plastic foils for purposes of using the foils in electrical capacitors.

Metalized plastic foils, ribbons, strips or the like are used as components in electrical capacitors wherein any coherent metallization establishes an electrode and the plastic is the dielectric material. For a variety of reasons a portion of such plastic foil, e.g. an edge strip has to be free from metalization. One way of obtaining such free areas is to prevent metalization thereof during the metalization step, e.g. by means of covers, strips, masks, etc.

Another method, broadly, involves the local demetalization of foil, which was metalized initially in its entirety. For example, one can burn off electrically a strip portion of the metalization. German Patent No. 425,870 and printed application Nos. 2,509,543 and 897,881 disclose mechanical removal of the metalization through scraping, brushing or the like. German printed patent application No. 1,938,320 describes the use of rubber covered disks cooperating with a counter roll over which the strips to be demetalized passes, and the rubber, so-to-speak, erases the metal from the foil. By and large the controlled subsequent local demetalization of completely metalized foil was found to be a more economical procedure than the selective local prevention of metal deposits during the metallization. However, the known methods of local demetallization have a number of insufficient draw-backs.

Burning off of metal by means of electrodes under electric tension is not suitable for thermo-plastic foil because the plastic deforms. Scrubbing, scraping, brushing or the like is better on that account as long as the tool friction does not heat the foil unduly. Also, using bonded corundum granules for scraping or finishing narrow strips is difficult because the corundum particles break or break off. Thus, these known mechanical techniques of metal removal have not yet been successfully practiced. The "erasing" technique is not practical because the rubber wears off very rapidly.

SUMMARY OF THE INVENTION

It is an object of the present invention to provide a new and improved method and equipment for demetalizing plastic foils.

In accordance with the preferred embodiment of the invention, it is suggested to demetalize the foil along a selected and selectible surface portion by means of a fast rotating metal disk (steel) whose peripheral grinding surface has been roughened, the roughness being established by integral, sharp-edge surface irregularities at an average height of about 0.01 mm, the roughness having been produced by means of sand blasting or electroerosion. The foil to be demetalized is tensioned against the grinding surface without back roller. It was found surprisingly that the high speed steel disk does not damage the very sensitive plastic foil.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENT

Figure 1:
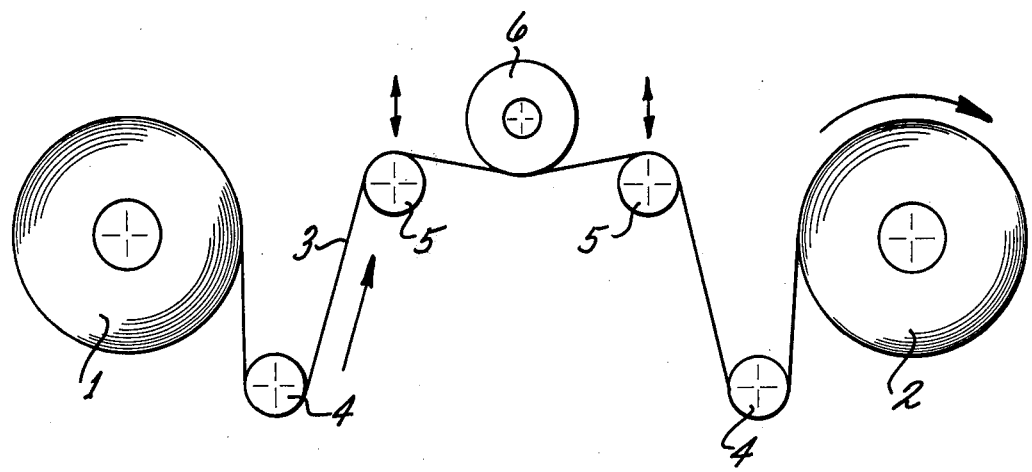
FIG. 1 is a schematic view of a system in accordance with the present invention.

Proceeding now to the detailed description of the drawings, FIG. 1 shows a payout spool or roll for a metalized plastic ribbon 3. The ribbon is to be used in capacitors. By way of example, the ribbon per se is made of polyesterterephthalate, and has a thickness of 2 $\mu$m. It carries, for example, a copper or aluminum layer, having a thickness of $5.10^{-2}$ $\mu$m.

Reference numeral 2 is a take-up spool or reel for the ribbon which has been partially demetalized, e.g. along one edge. The ribbon is guided between payout and take-up reels by means of a plurality of pulleys 4 and 5 whereby pulleys 4 are particularly provided for reorienting and reversing the ribbon paths adjacent to the reels, while pulleys 5 are provided to establish the operating area 7, holding the ribbon there across. These pulleys 5 are adjustable in direction of the double arrow to position the ribbon 3 in relation to the grinding disk 6. Adjustment of the pulleys (or of the grinding disk in a parallel direction) establishes the contact pressure between the disk and the ribbon. There is no back roller or the like in the back of the ribbon, opposite the grinding disk or wheel 6. Rather, due to the elasticity of the ribbon, it yields readily so that the contact pressure is the result of longitudinal tensioning of the ribbon as urged against the disk. it is advisable to control the displacement of the pulley 5 to obtain constant tension during the grinding.

Figure 2:
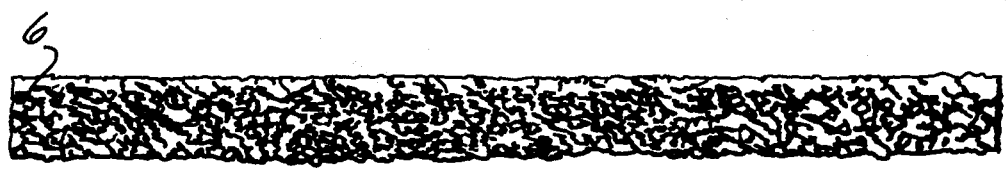
FIG. 2 is a drawing based on a photomicrograph of a portion of the grinding surface used in the system shown in FIG. 1.

The disk 6 has a periphery which can be seen in FIG 2. It has a large number of pits with sharp boundaries or edges. The pit diameters are predominantly from 0.02 mm to 0.03 mm, and the average pit height is about 0.01 mm. The disk 6 rotates at a speed of about 8000 RPM for a diameter of 10 to 15 mm, at a speed of movement of the ribbon between the reels of about 25 to 50 meters per minute. The particular disk has a width of about a little above half a millimeter, and is readily capable of demetalizing an edge zone of one-fifths of a millimeter or even less along the ribbon.

It should be mentioned that the ribbon itself may be rather wide and can be cut subsequently, for example, by means of a device as disclosed in U.S. Pat. No. 2,435,441. Both edges may have been demetalized prior to the longitudinal cutting in the manner as described.

The invention is not limited to the embodiments described above but all changes and modifications thereof not constituting departures from the spirit and scope of the invention are intended to be included.

I claim:

1. Method of partially demetalizing metalized plastic foil along a strip portion thereof, comprising:
    passing the foil along a rotating, grinding metal disk having a peripheral surface which has been roughened without addition of particles, an integral roughness thereof being established by sharp edges of surface irregularities of the metal; and tensioning the strip portion of the foil against the disk without support of the location directly opposite the disk to obtain the demetalization along the strip portion of the foil.

2. Method as in claim 1, said disk being made of steel.

3. Method as in claim 2, said roughness having been made by electroerosion.

4. Method as in claim 2, said roughness having been made by sandblasting.

5. Method as in claim 1, wherein the average height of the roughness is about 0.01 mm.

6. Equipment for partial demetalizing a metalized plastic ribbon, comprising:

reeling means for the foil including two tension rollers for tensioning a portion of the ribbon as it passes from a pay-out to a take-up means, also included in the reeling means;

a rotatable grinding disk with a rough integral peripheral surface against which the reeling means tension the ribbon as the disk rotates, the peripheral surface of the disk having a surface roughness established by integral sharp edges of surface irregularities of the metal without addition of any particles.

7. Equipment as in claim 1, wherein the average height of the roughness is about 0.01 mm.

* * * * *